July 28, 1953     M. B. STANDING ET AL     2,646,678

DRILLING FLUID FILTER LOSS TESTER

Filed Nov. 2, 1948

INVENTORS
Marshall B. Standing
Joseph F. Chittum

BY *John N. Adams*
*Walter G. Miller*
ATTORNEYS

Patented July 28, 1953

2,646,678

UNITED STATES PATENT OFFICE 2,646,678

DRILLING FLUID FILTER LOSS TESTER

Marshall B. Standing and Joseph F. Chittum, Whittier, Calif., assignors to California Research Corporation, San Francisco, Calif., a corporation of Delaware Application November 2, 1948, Serial No. 58,008

1 Claim. (Cl. 73—53)

This invention relates to apparatus for determining the characteristics of well drilling fluids and particularly refers to an improved arrangement of a tester for determining the filter loss and wall building properties of such fluids.

Heretofore the characteristics of well drilling fluids such as those which are made from slurries of clay or other finely divided solids suspended in a suitable liquid such as water or oil, have been determined by means of a small cylindrical filter press having a standardized filter element or disk through which the liquid component of the drilling fluid is forced by hydrostatic pressure, the rate of fluid passage, the amount of filtrate, and the thickness of filter cake left on the filter element in a given period of time being indicative of the behavior of such a drilling fluid in actual drilling operations. Such a device has been standardized by the American Petroleum Institute and is described in the A. P. I. Code No. 29, Second Edition, July 1942, entitled "Recommended Practice on Standard Filter Procedure for Testing Drilling Fluids," (tentative) pages 908 and 909.

The standard apparatus consists of a metal cup or cell of cylindrical shape having an internal diameter of 3 inches and a height of 5 inches. The top of the cell is fitted with a gasket and a removable cap which has a small hole for admission of a pressure medium, for example, compressed air. The bottom of the cell is adapted to receive a circular wire cloth screen on top of which is placed a sheet of Whatman No. 50 or 52 filter paper, and which is additionally gasketed to prevent leakage around the edge. The bottom of the cup has a central outlet for fluid filtrate from which the fluid flows into a small graduate calibrated in cubic centimeters.

In the use of this apparatus it was found that, with drilling fluids which have low filter loss characteristics, for example, less than about 5 cubic centimeters in thirty minutes, the quantity of fluid filtrate which is retained by the screen below the filter paper introduces a serious inaccuracy in the results obtained by this instrument and the standard procedure which has been established for its use. This deficiency is particularly serious in the testing of oil-base fluids, where the entire amount of filtrate may be retained in the cell during the measuring period.

Heretofore it has been considered essential that the filter paper element must be supported upon a screen or other reticulated member, to provide substantially unobstructed passage of the filtrate through the paper and out of the cell. In some testers more than one filtrate outlet has been considered necessary. It has been found, however, that by providing the bottom member of the filter cell with a substantially flat surface which is symmetrically grooved as described below, the screen or equivalent supporting material for the filter paper may be omitted, with the result that the amount of fluid filtrate which can be held up in the cell is reduced from about one or two cubic centimeters to a very small fraction of one cubic centimeter, thus greatly improving the accuracy of the testing procedure and the reproducibility of the results obtained in repeated testing of a given drilling fluid. At the same time, the fluid flow is not obstructed, and the standardized operations of measurement of time, fluid filtrate quantity, cake thickness, etc., are not affected.

It is an object of this invention to provide an improved apparatus for determining the filter loss and wall building characteristics of drilling fluids, particularly those having low rates of filter loss.

Another object is to provide an improved bottom plate or member for a standard filter press, such as that of the A. P. I. Code No. 29, which is currently manufactured and distributed by the Baroid Sales Division of the National Lead Company of Los Angeles, California.

Another object is to provide an improved and simplified support for the filter element of the particular form of filter cell such as is used for determining the characteristics of well drilling fluids.

These and other objects and advantages will be further apparent from the following description and from the attached drawing which illustrates a preferred embodiment of the invention.

In the drawing, Figure 1 is a vertical sectional view of a drilling mud tester, the bottom closure being constructed to embody this invention, the apparent width of the grooves being greatly exaggerated for purposes of illustration.

Figure 1:
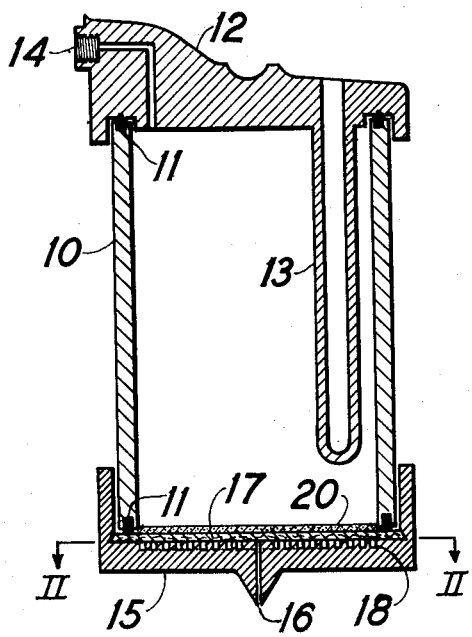

Referring to the drawing and particularly to Figure 1, reference numeral 10 designates a cylindrical metal shell provided on its upper and lower ends with an annular packing ring 11. The top of shell 10 is adapted to be closed by covering member 12 provided with a thermometer well 13 and a threaded opening 14 to which may be connected a source of fluid pressure, for example, compressed air, by means which are not shown.

The lower end of shell 10 is adapted to be closed by a metal bottom plate or member 15 which engages the lower packing ring 11 to make a fluid-tight seal when the entire assembly of 10, 12, and 15 is clamped together by any suitable means, not shown.

Figure 2:
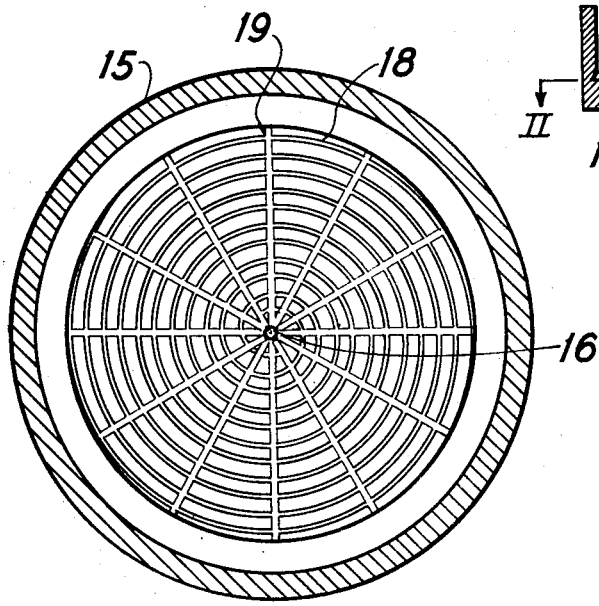
Figure 2 is a transverse sectional view on line II—II of Figure 1, illustrating a preferred arrangement of grooves and connecting channels, the apparent widths being greatly exaggerated to facilitate illustration.

Bottom member 15 is provided with a filtrate outlet 16, usually in its center and in this case of relatively small size, for example, approximately 0.03" in diameter. The upper face of bottom member 15 is substantially flat and forms a support for filtering element 17, in this example a disk of Whatman No. 50 or 52 filter paper. The upper face is also provided with a plurality of very narrow grooves 18 communicating with the filtrate outlet 16 and extending symmetrically over the area on which the filter paper 17 is received. Desirably but not necessarily grooves 18 are spirals as shown in Figure 2 and may be intersected by radial channels 19 which communicate with the filtrate outlet 16. A concentric or any other regular groove and channel pattern could obviously be substituted. The width of grooves 18 and channels 19 is desirably about 0.005" and the total projected area of the grooves does not need to be over about 5% of the total area of the upper face of bottom member 15 which is exposed to filter paper 17. The width and depth of the grooves and channels should be approximately equal so that they are semicircular, square, or rectangular in cross-section, and with relatively sharp edges. Burrs or chips that would tend to obstruct flow should be avoided.

A cell bottom of standard diameter (3") provided with a symmetrical spiral groove system in which the grooves 18 are 0.005" wide and 0.008" deep, spaced 0.08" radially, and with twelve similarly dimensioned channels 19 intersecting the grooves and the filtrate outlet 16 has been found to have a total space for filtrate of only about 0.08 cubic centimeters (0.005 cubic inches), as compared to the previous standard arrangement, which would hold up from 0.5 to 1.5 cubic centimeters by actual test.

Figure 3:
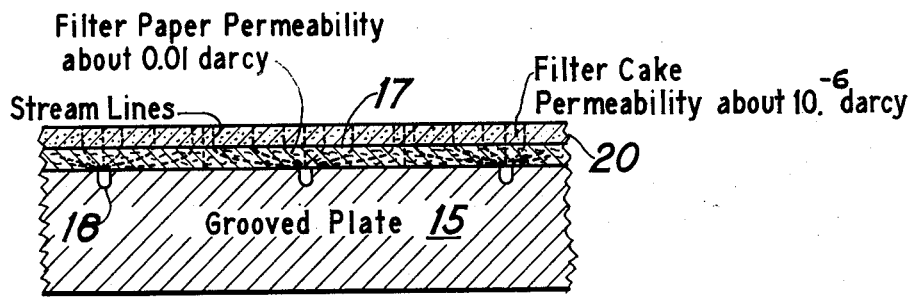
Figure 3 is a diagrammatic vertical sectional view, also to enlarged scale, illustrating the respective fluid flow and approximate permeability characteristics of the filter paper and the filter cake above a bottom plate embodying this invention.

Figure 3 illustrates generally the fluid flow and permeability conditions of which were found to make possible the successful operation of this invention. That figure illustrates to an enlarged scale a vertical sectional view of a bottom plate 15 with several grooves 18, above which is represented filter paper 17, which has a permeability when wet of about 0.01 darcy, and the filter cake 20 which is deposited by solids in the drilling fluid when the testing device is placed in operation and fluid filtrate is expressed from the body of the fluid through the filter paper under the hydrostatic pressure, usually 100 lbs. per square inch, within shell 10. The permeability of the usual filter cake is in the neighborhood of 0.000001 darcy.

A theoretical mathematical analysis can be made of the effect of the respective permeabilities of filter paper 17 and filter cake 20 on the flow of filtrate from the tester. Where the ratio of the permeabilities is about 10,000 to 1, the lines of flow of the filtrate through the less permeable filter cake are substantially vertical, while the lines of flow through the relatively highly permeable filter paper are substantially straight and radiate from the small exposed area of grooves 18 to an area between points that are substantially midway between the grooves at the juncture of filter cake 20 and the upper face of filter paper 17. The mathematical analysis, as well as the results of actual tests, indicate that after the first few seconds of the building up of filter cake 20, substantially all of the resistance to filtrate flow through the system comprising the cake and the paper is in the filter cake.

Although only about 5% of the area of the lower face of filter paper 17 is available for fluid filtrate to escape from the system into grooves 18 and channels 19, the flow out of the cell differs by only a negligible amount from that which would occur if the entire lower face of filter paper 17 were unobstructed. The reason why the obstructed flow is so nearly equal to the unobstructed flow is that the effect of the obstruction caused by the ungrooved plane area of the bottom plate below the filter paper is similar to the effect of a reduction in the permeability of the filter paper. However, the filter paper is so permeable (about 10,000 times) in comparison with the permeability of filter cake 20 disposed upon its upper surface, that even when it is effective permeability is greatly reduced as by contact with the ungrooved portion of the bottom plate, the paper still contributes only a small fraction of the total resistance to flow of fluid filtrate from the body of drilling fluid in shell 10 to outlet 16 and thence to the measuring receptacle or graduate which is placed below the filtrate outlet.

From the foregoing description and explanation it will be apparent that this invention comprehends broadly the provisions, in a drilling fluid filter loss tester of the type which utilizes a standardized filter element, on which a filter cake is formed from solids supended in the said drilling fluid of means forming a substantially plane support for the said filter paper, said means being symmetrically grooved over about 5% of its total surface, the grooves communicating with a filtrate outlet, so constructed and arranged that the obstruction to filtrate fluid flow offered by the said filter element and grooves is substantially less than that offered by the filter cake. The advantages gained by this improvement reside particularly in the material reduction in the quantity of fluid filtrate which can be held up in the testing unit below the filter paper, so that the filter loss characteristics of low loss drilling fluids, such as those made with starch, or involving oil bases can be measured successfully and accurately.

Although a specific arrangement of grooves and channels has been illustrated and described it is obvious that numerous modifications of this arrangement could be made without departing from the invention. Accordingly, all such changes as are embodied in the appended claim are embraced thereby.

We claim:

A bottom closure for the fluid receptacle of a drilling fluid filter loss tester of the closed cylindrical type comprising means forming a substantially flat bottom for said fluid receptacle, there being a short constricted fluid filtrate outlet passage for said bottom means, the upper face of said bottom means being provided with narrow intersecting grooves and adapted to receive a filter element, the ratio of the ungrooved area of said bottom means to that which is grooved being about 99:5, the combined volume of said grooves and outlet passage not exceeding about 0.08 cubic centimeters, whereby a minimum of fluid filtrate will be contained within said grooves and passage below said filter element.

MARSHALL B. STANDING.
JOSEPH F. CHITTUM.

References Cited in the file of this patent

UNITED STATES PATENTS

| Number | Name | Date |
|---|---|---|
| 1,690,763 | Wertheimer | Nov. 6, 1928 |
| 1,759,121 | Lamplota | May 20, 1930 |
| 2,217,175 | Ledbetter | Oct. 8, 1940 |
| 2,449,238 | Lightfoot, Jr. | Sept. 14, 1948 |